United States Patent
Himmelstoss et al.

(10) Patent No.: US 9,086,485 B2
(45) Date of Patent: Jul. 21, 2015

(54) RADAR SENSOR FOR MOTOR VEHICLES

(75) Inventors: Armin Himmelstoss, Weissach Im Tal (DE); Dirk Steinbuch, Wimsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 322 days.

(21) Appl. No.: 13/807,212

(22) PCT Filed: May 2, 2011

(86) PCT No.: PCT/EP2011/056911
§ 371 (c)(1),
(2), (4) Date: Mar. 8, 2013

(87) PCT Pub. No.: WO2012/000701
PCT Pub. Date: Jan. 5, 2012

(65) Prior Publication Data
US 2013/0162464 A1    Jun. 27, 2013

(30) Foreign Application Priority Data
Jun. 29, 2010    (DE) .......................... 10 2010 030 628

(51) Int. Cl.
*G01S 7/02* (2006.01)
*G01S 7/40* (2006.01)
(Continued)

(52) U.S. Cl.
CPC ................. *G01S 13/931* (2013.01); *G01S 7/03* (2013.01); *G01S 7/038* (2013.01); *G01S 7/354* (2013.01); *G01S 7/40* (2013.01); *G01S 13/34* (2013.01); *G01S 2007/356* (2013.01)

(58) Field of Classification Search
CPC ............. G01S 7/02; G01S 7/03; G01S 7/038; G01S 7/35; G01S 7/352; G01S 7/354; G01S 7/40; G01S 2007/356; G01S 13/02; G01S 13/06; G01S 13/08; G01S 13/32; G01S 13/34; G01S 13/88; G01S 13/93; G01S 13/931
USPC ........... 342/27, 28, 70–72, 82–103, 159, 165, 342/173–175, 195; 327/100, 306, 307; 341/118; 375/259, 260, 316, 317, 319; 455/130, 226.1
See application file for complete search history.

(56) References Cited

U.S. PATENT DOCUMENTS 6,054,887 A * 4/2000 Horie et al. ................... 327/307
6,356,217 B1 * 3/2002 Tilley et al. ................... 341/118
(Continued)

FOREIGN PATENT DOCUMENTS

| WO | WO 2006/118184 | 11/2006 |
| WO | WO 2009/124297 | 10/2009 |
| WO | WO 2010/058244 | 5/2010 |

OTHER PUBLICATIONS

International Search Report for PCT/EP2011/056911, dated Jul. 19, 2011.
(Continued)

Primary Examiner — Bernarr Gregory
(74) Attorney, Agent, or Firm — Kenyon & Kenyon LLP

(57) ABSTRACT

A radar sensor for motor vehicles includes: a transmit and receive component, which includes a mixer for mixing a transmitted signal with a received signal; an evaluation circuit which is connected to an output of the mixer by a direct voltage coupling device; and a compensation device for compensating a DC offset in the output signal of the mixer, the compensation device being subdivided into a rough compensation device in the transmit and receive component, and a fine compensation device in the evaluation circuit.

6 Claims, 1 Drawing Sheet

(51) Int. Cl.
*G01S 13/93* (2006.01)
*G01S 7/03* (2006.01)
*G01S 7/35* (2006.01)
*G01S 13/34* (2006.01)
*G01S 7/00* (2006.01)
*G01S 13/00* (2006.01)

(56) References Cited

U.S. PATENT DOCUMENTS

| | | | | |
|---|---|---|---|---|
| 6,625,232 | B1 * | 9/2003 | Tilley | 375/319 |
| 7,129,867 | B2 * | 10/2006 | Kim et al. | 341/118 |
| 7,365,662 | B2 * | 4/2008 | Marsili et al. | 341/118 |
| 7,538,719 | B2 * | 5/2009 | Kanaya | 342/175 |
| 7,952,501 | B2 * | 5/2011 | Kim et al. | 341/118 |
| 8,254,480 | B2 * | 8/2012 | Aytur et al. | 375/260 |
| 8,666,343 | B2 * | 3/2014 | Shanan | 455/226.1 |
| 8,831,079 | B2 * | 9/2014 | Liao et al. | 342/175 |
| 2014/0159943 | A1 * | 6/2014 | Jaeger | 342/90 |

OTHER PUBLICATIONS

Nicholson, S., et al.: "Single-Chip W-band SiGe HBT Transceivers and Receivers for Doppler Radar and Millimeter-Wave Imaging", IEEE Journal of Solid-State Circuits, IEEE Service, Center, Piscataway, NJ, USA, vol. 43, No. 10, Oct. 1, 2008, pp. 2206-2217.

Perndle, W. et al., "A Low-Noise and High-Gain Double-Balancing Mixer for 77 GHz Automotive Radar Front-Ends in SiGe Bipolar Technology", Radio Frequency Intergrated Circuits (RFIC) Symposium, 2004. Digest of Papers. Jun. 6, 2004, pp. 6-8.

* cited by examiner

RADAR SENSOR FOR MOTOR VEHICLES

BACKGROUND OF THE INVENTION

1. Field of the Invention

The present invention relates to a radar sensor for motor vehicles, having a transmit and receive component which includes a mixer for mixing a transmitted signal with a received signal; it also has an evaluation circuit which is connected to an output of the mixer by a direct voltage coupling device, as well as a compensation device for compensating a DC offset in the output signal of the mixer.

2. Description of the Related Art

Radar sensors in motor vehicles are used for tasks such as locating other vehicles within the scope of distance control systems or collision warning systems. Via an antenna, the transmit and receive component transmits a radar signal, which is modulated in its frequency in ramp-type manner. The radar echo received by the antenna is mixed with a portion of this transmitted signal in the mixer, so that a baseband signal is obtained whose frequency corresponds to the frequency difference between transmitted and received signal. Since this frequency difference is a function of the signal propagation time and the frequency shift caused by the Doppler effect, it provides information about the distance and the relative speed of the located object. The baseband signal is amplified and digitalized in the evaluation circuit and then forwarded to additional evaluation stages, e.g., a transformation stage, where the time-dependent baseband signal is broken down into its frequency spectrum by a fast Fourier transformation (FFT), in which the located objects manifest themselves in the form of individual peaks.

The transmit and receive component typically is formed by an MMIC (monolithic microwave integrated circuit), while the evaluation circuit typically is a user-specific integrated circuit (ASIC), a so-called RADAR-ASIC. The direct voltage coupling between the mixer output and the RADAR-ASIC makes it possible to analyze the entire information content of the baseband signal because no frequency components are lost by filtering out a direct voltage component. However, in the amplification of the baseband signal this type of coupling causes the direct voltage component contained therein to be amplified as well before the analog-digital conversion is able to take place. The DC offset amplified in this manner may cause the baseband signal to no longer fit into the voltage window of the analog-digital converter, so that overmodulation occurs, which leads to distortion errors in the subsequent Fourier transformation.

For this reason, known radar sensors include a compensation device, which compensates the direct voltage in the baseband signal before it is forwarded to the amplifier, the compensation taking place with the aid of current sources and resistors situated in the signal path. The current sources and the resistors for the compensation device are located in the RADAR-ASIC.

One disadvantage of this known design of the compensating device is that the resistors in the signal path required for the compensation contribute to an increased noise component and therefore have a detrimental effect on the quality of the signal, and thus on the quality of the radar detection. While it is in principle possible to suppress the noise by using lower resistance values and correspondingly higher current intensities, the current intensity is able to be increased only within certain limits, and it also contributes significantly to an increase in power losses. Until now the resistors must therefore be configured in such a way that a compromise is found between the contrary goals of low noise and low power losses.

BRIEF SUMMARY OF THE INVENTION

It is an object of the present invention to provide a radar sensor which has lower power losses at a given noise component, and which has less noise at a given power loss.

According to the present invention, this objective is achieved in that the compensation device is subdivided into a rough compensation device in the transmit and receive component, and a fine compensation device in the evaluation circuit.

The DC offset in the baseband signal is composed of a plurality of components which are attributable to different sources, among them, internal cross-talk between the transmit and receive channels, installation-related reflections of the radar signal at vehicle components such as bumpers, the radome of the radar sensor and the like, reflections of the radar signal due to soiling of or ice buildup on the radar antenna or the radome, as well as temperature drift and aging of the electronic components of the radar sensor. While a few of these factors are subject to change over time, other factors are constant over time or at least have a relatively large temporally constant component. This holds true, for example, for direct voltage components that are caused by internal cross-feed between the transmit and receive channels and by installation-related reflections.

According to the present invention, these temporally essentially constant components of the DC offset are already compensated by the rough compensation device in the transmit and receive component, so that the only task remaining for the fine compensation device in the evaluation circuit is to compensate the remaining direct voltage components that have a higher temporal variability. Since these variable DC components have a lower amplitude, the compensation is able to be brought about by lower resistor values and thus by means of a correspondingly low-noise fine compensation device. On the side of the rough compensation device, the present invention utilizes the fact that the transmit and receive component must have indispensable load resistors in the mixer anyway, which invariably make a certain contribution to the overall noise of the radar sensor. By utilizing these already existing load resistors, the rough compensation device is therefore able to largely compensate the essentially constant components of the DC offset, without this requiring an additional increase in the noise component.

DETAILED DESCRIPTION OF THE INVENTION

Figure 1:
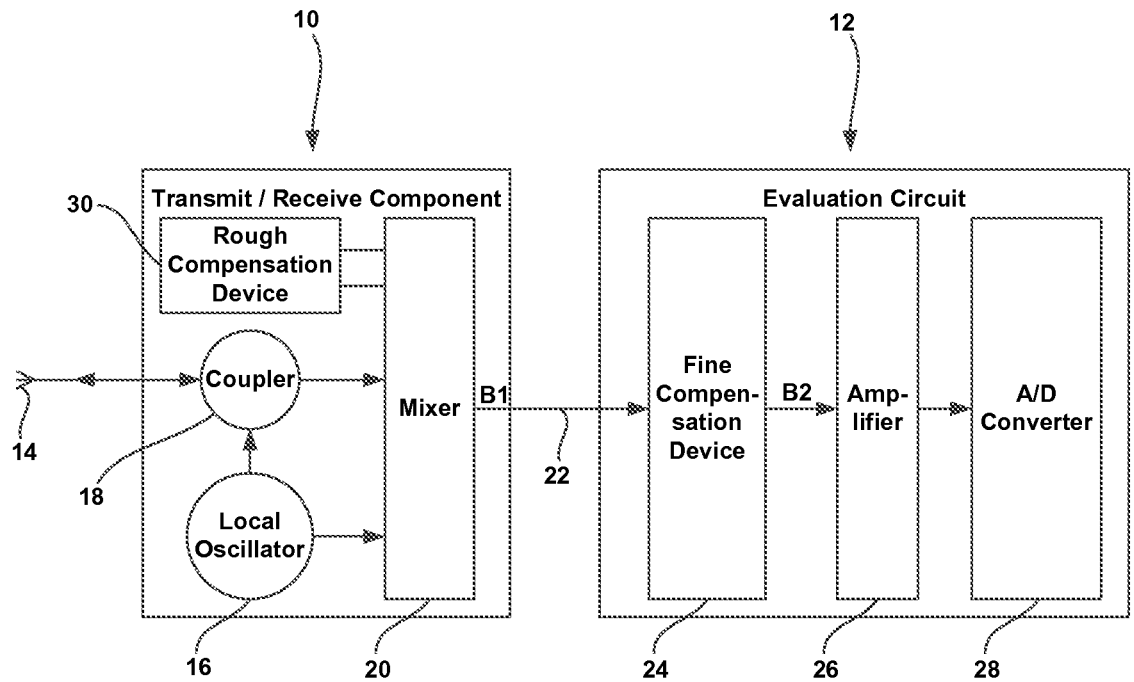
FIG. 1 shows a block diagram of a radar sensor according to the present invention.

The radar sensor shown in simplified form in FIG. 1 as a block diagram includes a transmit and receive component 10 in the form of an MMIC (monolithic microwave integrated circuit) and an evaluation circuit 12 in the form of a RADAR-ASIC. An antenna 14, which receives a frequency-modulated radar signal from a local oscillator 16, is connected to transmit and receive component 10, the radar signal then being radiated into the environment by the antenna. The radar echo reflected at objects is then received again by antenna 14, separated in a coupler 18 from the signal supplied by local oscillator 16 and forwarded to an input of a mixer 20. Another input of mixer 20 directly receives the signal (transmitted signal) generated by local oscillator 16. In mixer 20, this transmitted signal is then mixed with the signal received via antenna 14, so that a baseband signal B1 is obtained at the output of the mixer, the frequency of which corresponds to the frequency difference between the transmitted signal and the received signal. This baseband signal B1 is forwarded to a fine compensation device 24 in evaluation circuit 12 via a direct voltage coupling device 22 (e.g., a galvanic line without capacitive or inductive elements which would suppress the direct voltage component). In fine compensation device 24, the baseband signal is modified and output as baseband signal B2. This baseband signal is amplified in an amplifier 26 and finally forwarded to an analog/digital converter 28.

Different factors, especially reflections of the transmitted radar signal at nearby objects, internal cross-talk between transmit and receive component 10, as well as aging and temperature drift of different electronic components cause the baseband signal produced in mixer 20 to include various DC components. Some of these DC components are essentially constant over time and already compensated in transmit and receive component 10 with the aid of a rough compensation device 30. Rough compensation device 30 feeds a compensation current into the load resistors of mixer 20 for this purpose. This mixer is, for instance, a Gilbert cell mixer having the known structure. The current produced by rough compensation device 30 causes a voltage drop at the load resistors; because of this voltage drop the constant DC components in the baseband signal are already filtered out, so that baseband signal B1 ultimately applied at the mixer output already has a considerably reduced DC offset. The temporally more variable DC components in baseband signal B1 are then compensated with the aid of fine compensation device 24, so that baseband signal B2 forwarded to amplifier 26 basically no longer has any DC offset.

Fine compensation device 24 accomplishes the fine compensation of the DC offset with the aid of current sources and resistors (not shown), as they are basically known from conventional radar sensors. However, since the broadband signal has already undergone a rough compensation, the DC components still to be suppressed by fine compensation device 24 are relatively low. This means that, by selecting lower resistor values, fine compensation device 24 is able to be configured in such a way that little noise is produced.

The greater share of the DC offset is already suppressed in transmit and receive component 10 with the aid of rough compensation device 30. Since rough compensation device 30 utilizes the load resistors already installed in the mixer for this purpose, this rough compensation does not cause an increase in the noise as a whole. Overall, an effective suppression of the direct voltage component is therefore achieved at low current intensities and with correspondingly low power losses, without increasing the noise components in baseband signal B2 in the process.

The current sources forming the rough compensation device are part of the MMIC and thus programmable prior to the initial operation like the entire MMIC. While the radar sensor is operating, these current sources are therefore largely decoupled from any actuation. The current sources are programmed in such a way that they eliminate the particular component of the DC offset that is constant in the long run, as elucidated in the following text on the basis of an example illustrated in FIG. 2.

Figure 2:
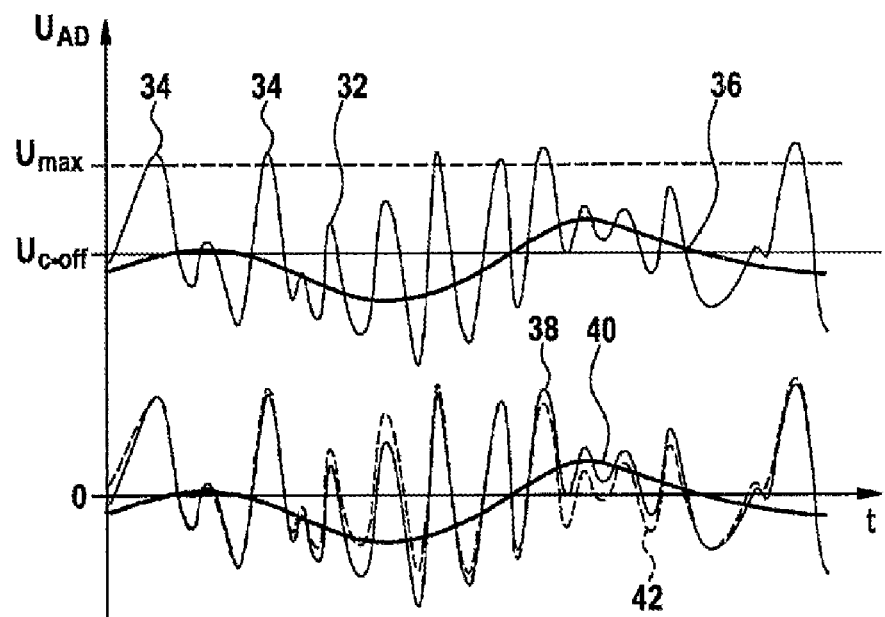
FIG. 2 shows timing diagrams of a baseband signal in the radar sensor according to FIG. 1.

In FIG. 2, a curve 32 shows the characteristic of the baseband signal that would be obtained at the output of mixer 20 if rough compensation device 30 would not take effect. Curve 32 (similar to all other voltage curves in FIG. 2) is scaled in such a way that it indicates voltage $U_{AD}$ that would result following an amplification in amplifier 26, i.e., at the input of analog/digital converter 28. It is obvious from curve 32 that the baseband signal originally produced in mixer 20 (without rough compensation) includes a temporally constant DC offset $U_{c\text{-}off}$ of considerable magnitude. This offset (toward the positive side in the illustrated example) at times causes the signal indicated by curve 32 to exceed a limit $U_{max}$, which represents the upper limit of the voltage window of analog/digital converter 128. The apex of the peaks, denoted by 34 in FIG. 2, that exceed $U_{max}$, would therefore be "cut off" during the further processing in analog-to-digital converter 28, so that an undesired signal distortion and thus a falsified frequency spectrum would be obtained.

A curve 36 in FIG. 2 shows the characteristic of the baseband signal that would be obtained following filtering at a relatively high time constant, and therefore represents a temporally variable DC offset of the baseband signal.

Rough compensation device 30 then is programmed in such a way that it compensates constant DC offset $U_{c\text{-}off}$. The result thus obtained at the output of mixer 20 is baseband signal B1, which has already undergone a rough compensation and which is shown in FIG. 2 by a curve 38 represented by solid lines. Even at large excursions, this signal lies within the voltage window of analog/digital converter 28 and thus will not be distorted during the digitalization either. The signal indicated by curve 38 only still includes a temporally variable DC offset, which is now indicated by curve 40 (curve 36 shifted by $U_{c\text{-}off}$). Since the constant DC offset has already been eliminated, curve 40 oscillates about the zero line. Fine compensation device 24 finally also compensates the variable component of the DC offset, which is represented by curve 40. Baseband signal B2 thereby obtained at the input of amplifier 26 is represented by curve 22 plotted by dashed lines in FIG. 2, and oscillates about the zero line at a variable amplitude; in other words, there is barely any DC offset present any longer.

What is claimed is:

1. A radar sensor for motor vehicles, comprising:
   a coupling device;
   a transmit-and-receive component including:
      a mixer for mixing a transmitted signal with a received signal; and
      a rough compensation device for compensating a first DC offset in an output of an output of the mixer; and
   an evaluation circuit to which the output of the mixer is forwarded via the coupling device, wherein the evaluation circuit includes a fine compensation device for compensating a second DC offset, and wherein the coupling device is adapted for conducting direct voltage.

2. The radar sensor as recited in claim 1, wherein the transmit-and-receive component is a monolithic microwave integrated circuit.

3. The radar sensor as recited in claim 1, wherein the rough compensation device has at least one current source which feeds a compensation current into a load resistor of the mixer.

4. The radar sensor as recited in claim 3, wherein the mixer is a Gilbert cell mixer.

5. The radar sensor as recited in claim 3, wherein the current source of the rough compensation device is programmable for the output of a constant current.

6. The radar sensor as recited in claim 1, wherein the coupling device is a galvanic line without capacitive elements that suppress direct voltage and without inductive elements that suppress direct voltage.

* * * * *